United States Patent
Read

(10) Patent No.: US 8,261,305 B2
(45) Date of Patent: *Sep. 4, 2012

(54) SYSTEM AND METHOD FOR SCROLLING THROUGH TV VIDEO ICONS BY CATEGORY

(75) Inventor: Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/574,975

(22) Filed: Oct. 7, 2009

(65) Prior Publication Data

US 2010/0023971 A1    Jan. 28, 2010

Related U.S. Application Data

(63) Continuation of application No. 11/725,840, filed on Mar. 19, 2007.

(51) Int. Cl.
*H04N 5/445* (2006.01)
*G06F 3/00* (2006.01)
*G06F 13/00* (2006.01)

(52) U.S. Cl. ............ 725/52; 715/700; 345/676; 725/45; 725/61

(58) Field of Classification Search .................. None
See application file for complete search history.

(56) References Cited

U.S. PATENT DOCUMENTS

| | | | |
|---|---|---|---|
| 5,297,041 A * | 3/1994 | Kushler et al. | 715/202 |
| 5,737,029 A * | 4/1998 | Ohkura et al. | 725/56 |
| 5,903,314 A * | 5/1999 | Niijima et al. | 725/44 |
| 6,236,395 B1 * | 5/2001 | Sezan et al. | 715/723 |
| 6,842,653 B2 * | 1/2005 | Weishut et al. | 700/83 |
| 2004/0268393 A1 * | 12/2004 | Hunleth et al. | 725/44 |
| 2006/0271594 A1 * | 11/2006 | Haberman | 707/104.1 |
| 2008/0046943 A1 * | 2/2008 | Colsey et al. | 725/110 |
| 2008/0155459 A1 * | 6/2008 | Ubillos | 715/783 |

* cited by examiner

*Primary Examiner* — Nasser Goodarzi
*Assistant Examiner* — Fred Peng
(74) *Attorney, Agent, or Firm* — John L. Rogitz

(57) ABSTRACT

In a TV displaying thumbnails of videos grouped by genre, genre labels are shown so that a user can conveniently move genre to genre with a single click on a remote control device.

3 Claims, 4 Drawing Sheets

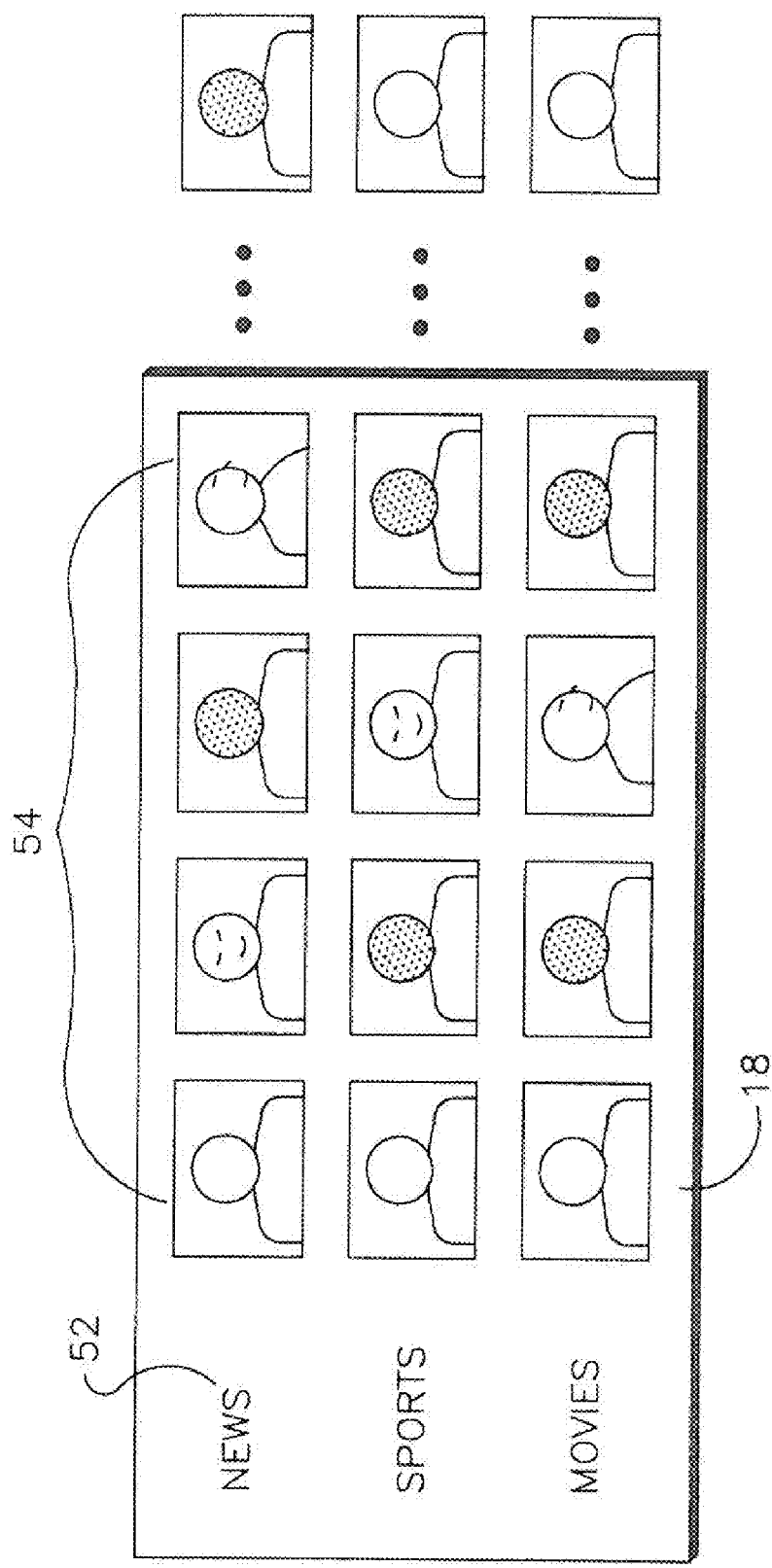

SYSTEM AND METHOD FOR SCROLLING THROUGH TV VIDEO ICONS BY CATEGORY

This is a continuation of and claims priority to U.S. patent application Ser. No. 11/725,840, filed Mar. 19, 2007.

FIELD OF THE INVENTION

The present invention relates to systems and methods for scrolling trough TV-presented video icons by category.

BACKGROUND OF THE INVENTION

Many modern audio/video delivery systems possess the ability to either view or electronically record and store data such as videos and television shows that are often provided by a user's television content provider or by an Internet provider through an Internet adapter connected to the TV. The user may either view the data immediately or access electronically stored data at a later time. A user may wish to view the data at a later time for a number of reasons. For instance, a user may desire to view a television show that is broadcast late at right and the user would find it more convenient to watch the show during the day. In order to browse through incoming and stored data, the user may be required to scroll through lists of the recorded videos when trying to identify the specific data the user wants to access.

Scrolling involves a selection process whereby an indicator or cursor moves from one piece of data to another (in the present context, from one video icon or thumbnail to another), highlighting a particular selection. While scrolling, if the highlighted selection is chosen the audio/visual delivery, system will produce that data for viewing. As intimated above, the packages of data (e.g. videos) that a user may scroll through are often represented by thumbnail images that allow the user to identify particular data through a single image. For example, there may be a list of thumbnails representing previously aired television or Internet programs that the system has saved in its memory. The thumbnails may be scrolled through by controlling a cursor using selection keys, such as up and down arrows embodied on a remote control, until the cursor highlights the television program the user wishes to view. The user then selects this television program for viewing and the system produces the data through a television set.

Currently, a user must scroll though each thumbnail separately while browsing an entire list of thumbnails. The data represented by thumbnails are often grouped together according to certain criteria, e.g. grouped according to the genre (category) of the television program. Presently, a user wishing to view available data grouped together under one category must scroll through all preceding groups of thumbnails grouped under preceding categories. This can be time consuming, and inconvenient to users who wish to skip directly to thumbnails grouped under a user-desired category. The present invention provides a method for a user to skip entire groups of thumbnails without having to browse through thumbnails associated with a different criteria first, thereby reaching the desired group of thumbnails more quickly.

SUMMARY OF THE INVENTION

In a TV displaying thumbnails of videos grouped by genre, genre labels are displayed and a user is enabled to move a screen cursor from a first genre label to a second genre label with a single click on a remote control device.

The above logic may be executed by a processor within a TV, or by a processor within an Internet adapter coupled to a TV, or by other processors.

In one implementation, a first genre includes plural rows of thumbnails presented on the displays and a first genre label is presented at the beginning of an initial row of thumbnails associated with the first genre. Also a second genre label is presented at the beginning of an initial row of thumbnails associated with the second genre. It is to be understood that equivalently, the label can be placed at the end of a row, and/or that instead of rows the thumbnails can be arranged in columns and the genre label placed at the top or bottom of the column.

In non-limiting embodiments, if the screen cursor is positioned over a first thumbnail in a row of thumbnails and a "down" key is manipulated on the remote control device, the cursor moves to a second thumbnail below the first thumbnail, skipping a partial row if no thumbnail is in the partial row between the first and second thumbnails, and if the screen cursor is positioned over the first thumbnail in a row of thumbnails and a "left" key is manipulated on the remote control device, the cursor moves to the genre label, if any, in the row, with a subsequent manipulation of a "down" key causing the cursor to move to a succeeding genre label, skipping any rows of thumbnails between the rows of the genre labels. A video stream can be invoked by moving the cursor over a thumbnail and appropriately manipulating the remote control device. In one display aspect, one and only one row per genre label is displayed.

In another aspect, a TV system includes a TV display and a processor sending images to the display. An image can include plural icons representing respective videos, and the image can also show first and second video genre indicators. A remote control manipulable by a person can cause a cursor on the display to move from the first video genre indicator to the second video genre indicator, skipping any rows of icons between the genre indicators.

In yet another aspect, video thumbnails grouped by genre are presented on a TV. A genre indicator is presented with each group of thumbnails, and a user is permitted to move a cursor from one genre indicator to another genre indicator with a single click of a remote such that any thumbnails displayed between the indicators are skipped.

The details of the present invention, both as to its structure and operation, can best be understood in reference to the accompanying drawings, in which like reference numerals refer to like parts, and in which:

BRIEF DESCRIPTION OF THE DRAWINGS

FIGS. 3 and 4 are non-limiting TV screen shots of thumbnails in accordance with present principles.

DETAILED DESCRIPTION OF THE PREFERRED EMBODIMENT

Figure 1:
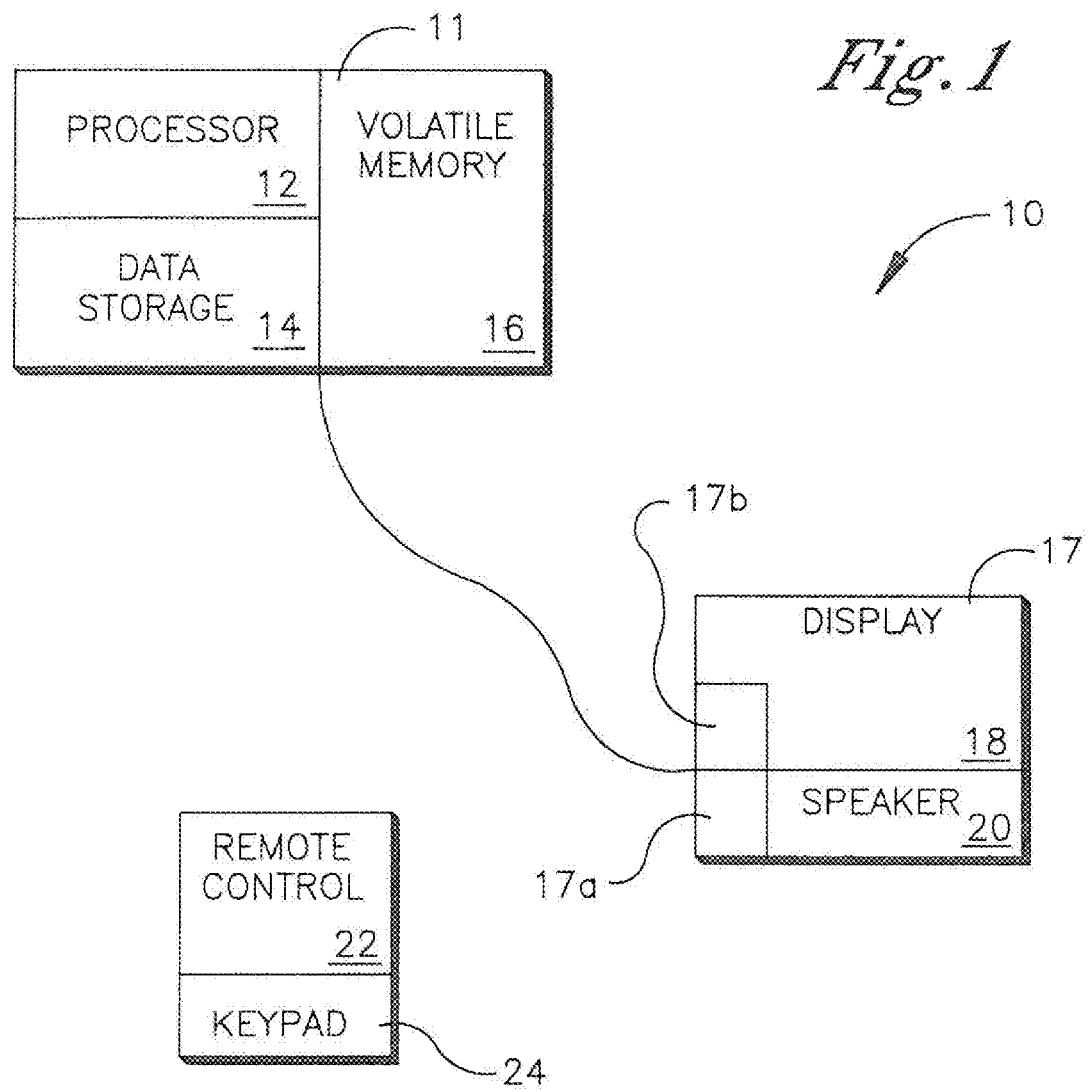
FIG. 1 is a block diagram of a non-limiting system in accordance with present principles.

Beginning with FIG. 1, a system is shown, generally designated 10, which includes one or more multimedia display systems 11, each having a processor 12 and data storage 14 that may be implemented one or plural disks, or other storage that can hold multimedia streams. Further, the display system 11 may include a volatile non-limiting memory unit 16. The volatile non-limiting memory unit 16 may include any hardware associated with active computer memory, e.g. RAM memory that is utilized by the digital multimedia source system 11 itself to perform various functions.

The multimedia display system 11 can be a digital multimedia source device that outputs audio/video files. For example, the multimedia display system 11 may be a digital video disk (DVD) player that can output digital multimedia conforming to the High Definition Multimedia Interface (HDMI) standard or other standards. Or, the display system 11 may be another source of multimedia such as an Internet adapter, in which the processor 12 executes a browser to access the Internet and to provide the videos for display on the below-described TV. Yet again the display system 11 may be implemented as a set-top box, a game console such as but not limited to Sony Playstation 3, etc.

In any case, as shown the digital multimedia source device 11 communicates with a TV 17 having a TV display, 18 and audio speakers 20 for presenting audio/video programs. It is to be understood that the TV 17 typically includes its own TV processor 17a with associated computer storage medium 17b such as disk or solid state storage, and that the source device 11 may be implemented in the same housing as the TV 17 or may be housed separately therefrom and communicates with the TV through a wired or wireless path. The TV processor 17a or another processor may undertake the below logic including grouping video stressors (and their respective icons/thumbnails) by genre.

Also, a remote control 22 is shown which communicates with the digital multimedia source device 11 and/or TV 17 wirelessly such as through infrared or radio waves. Further, the remote control 22 has a keypad 24 which is used to input user commands. Generally, the remote control 22 allows the user to remotely issue commands to the system 10, e.g, to command the system 10 to present a particular audio/video data stream on the display 18.

Figure 2:
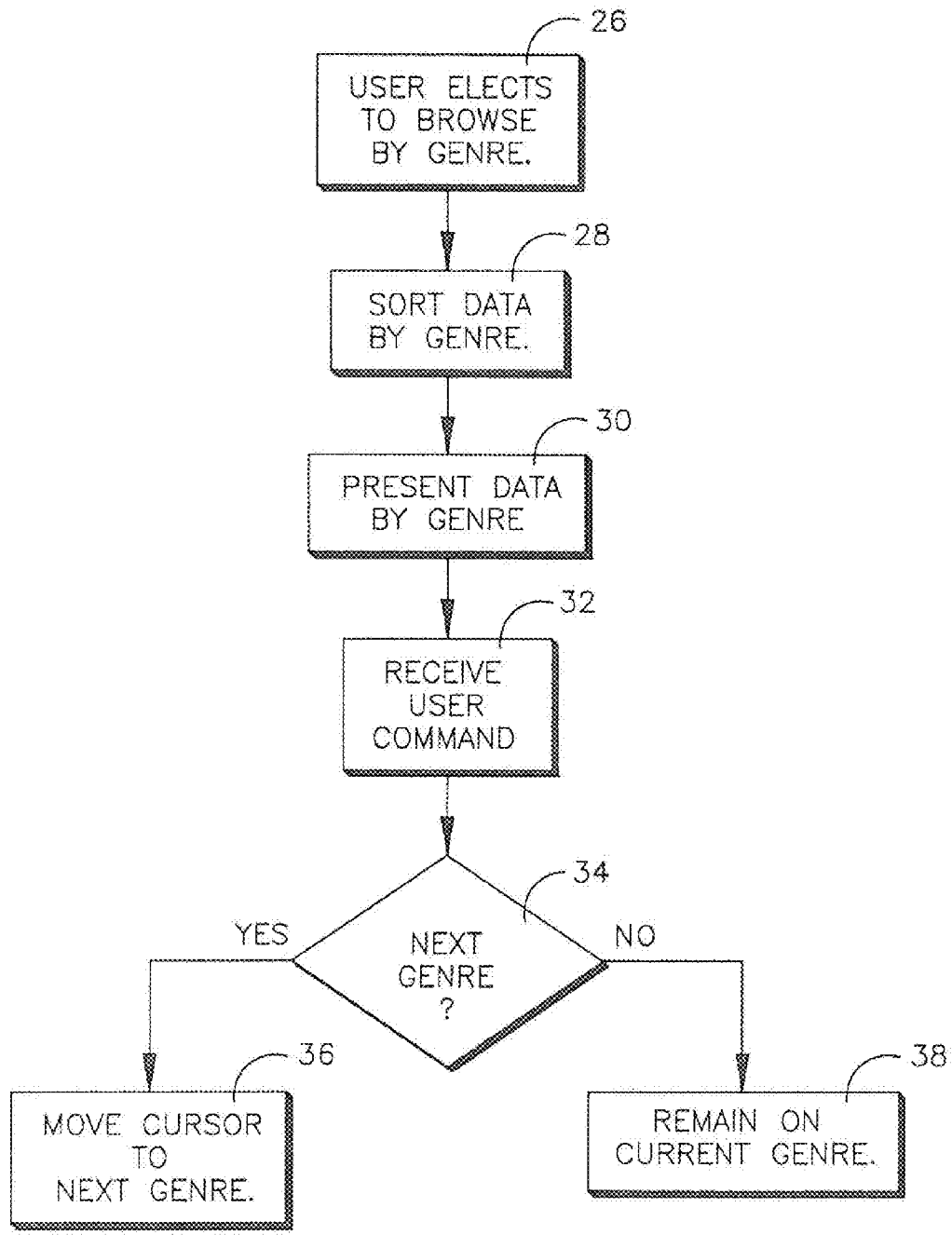
FIG. 2 is a flow chart of non-limiting logic in accordance with present principles.

Moving to FIG. 2, the logic for scrolling through audio/video data based on genre is shown. Beginning at optional block 26, while the present logic for scrolling by genre can be automatically invoked, in some implementations the user may be given the option of initiating the genre selection process by choosing to browse available streams of data based on the particular genre each stream of data is associated with. A genre is generally understood to be a class or category of streams of video. The selection can be made by means of an initial screen that asks the user to select whether to browse from one genre to the next, or whether to browse from thumbnail to thumbnail.

Moving to block 28, the logic sorts available streams of data according to the appropriate genre associated with each one, it being understood that the sorting can be done beforehand. Typically, when a user's audio/visual content provider (e.g. Direct TV, or the Internet when the source 11 is an Internet adapter) sends a stream of data which the user may then access, the stream of data that is sent includes metadata from which the category or genre of the video can be determined. However, the genre that is assigned to a particular stream of data is not to be limited to one particular method and may be determined plural ways.

Moving to block 30 the logic presents on the TV groups thumbnails or other icons representing respective videos, with the grouping being done according to the genre of the underlying videos. At block 32, the logic receives a command from the user and at decision diamond 34, the logic proceeds based on the user's command. If the user commands the logic to skip the genre of streams of data currently presented and move to the next genre of available streams of data by, e.g., selecting "browse by genre" at block 26 and then manipulating an up or down cursor control error key, the logic moves to block 36 where the cursor moves to the first thumbnail of the next genre. Equivalently, only thumbnails representing video in the next genre may be presented to the user.

On the other hand, if the user commands the logic to remain on the current genre to browse videos in the current genre by, e.g., selecting "browse video by video" at block 26 or by selecting "browse by genre" at block 26 but then manipulating a left or right cursor control key, the logic flows to block 38 to move the cursor to the next thumbnail in the current row.

One non-limiting method for scrolling through thumbnails or genres from which to browse may be through utilization of a mobile cursor manipulated through the keypad 24. A cursor used in this manner may be similar in mobility to that of a personal computer cursor that is manipulated through a mouse. When scrolling through thumbnails or genres, a user's manipulation of the keypad 24 causes the cursor to highlight different thumbnails or genres. Further, to view the highlighted genre or thumbnails the user may additionally be required to select the highlighted thumbnail or genre through another key on the keypad 24 such as a select key.

Figure 3:
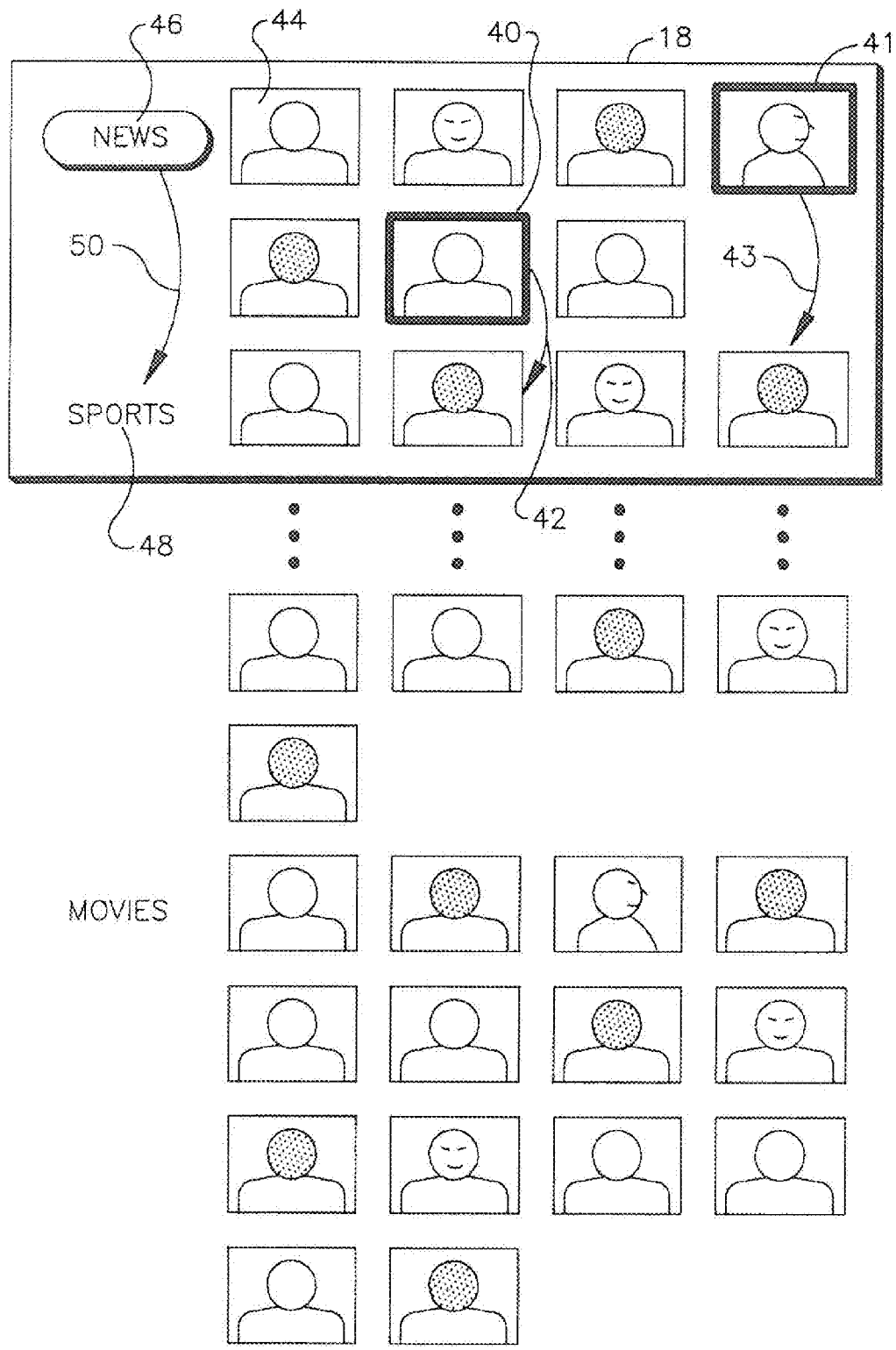

Referring to FIG. 3, a 4×3 arrangement of thumbnails is shown as presented on the TV display 18 with a genre name at the beginning of each line that starts a new genre, it being understood that icons other than thumbnails can be used to represent respective video streams available for viewing. Shown below the display 18 in FIG. 3 are thumbnails and genre titles that are in memory bit are not displayed on-screen and thus are not currently visible to the TV viewer, although they are available to the viewer if he scrolls down to them.

In FIG. 3, the highlighted thumbnail 40 indicates that the display cursor is over the thumbnail 40 and thus that the screen presentation is focused on the thumbnail 40. If the user presses a "select" key the underlying video stream will be rendered (e.g., if the thumbnail 40 represents a movie, the movie is played).

The user can navigate around the screen by pressing the left, right, up, and down keys on the remote 22 shown in FIG. 1. Pressing the "right" key causes the focus to move to the thumbnail just to the right of the thumbnail 40. In contrast, pressing the down key causes the focus to move to the thumbnail just below the thumbnail 40 as indicated by the arrow 42. Likewise, when the focus (cursor) is on a thumbnail 41 under which there is no thumbnail in the next sequential row and the down key is pressed, the focus skips a line as indicated by the arrow 43 to move to a thumbnail more than one row away from the thumbnail 41.

In accordance with the present invention, pressing the "left" key when the cursor is on a leftmost thumbnail 44 in a row causes the focus to shift to that row's genre label 46, instead of to another thumbnail. If the "down" key is then pressed, the cursor moves to the next genre 48, as indicated by the arrow 50, such that the user can move genre to genre with a single "up" or "down" key click. Consequently, in the case where there are many thumbnails within a genre, this inventive feature reduces the number of times the down key must be pressed to get to the next genre, and provides a more random-access (versus serial) way of navigating through the thumbnails. It may now appreciated that when the cursor is over the "sports" genre 48 and the "down" key is once again manipulated on the remote 22, the "movie" genre shifts on to the display 18 with the top row of the movie genre being the new top row presented on the display 18.

FIG. 4 shows an alternate on-screen implementation that may he used. Each genre 52 initially gets at most a single row 54 of icons on the display 18 that represent videos falling within the genre, with the remaining (unshown) thumbnails in each genre row conceptually to the right of the presented thumbnails. In this case when the user scrolls left and the focus moves to a genre label 52, the user can conveniently move genre to genre with a single "down" (or "up") key click.

If the user presses the "right" key on the remote 22 so that the focus moves right from a genre label 52 to a thumbnail, then the on-screen display could assume the configuration of FIG. 3 to show more than a single row of thumbnails per genre.

Thus, the arrangement of thumbnails in FIGS. 3 and 4 may both be used in the system, switching between the two styles of layout depending on where the focus/cursor is. The arrangement of thumbnails as shown in FIG. 3 may be used for instance, when the focus/cursor is on a thumbnail. When the focus/cursor is moved to be on a genre in FIG. 3, however, the screen display can switch to that shown in FIG. 4. This arrangement has the advantage of showing a genre name for each row on the screen—thus the user can see more genre names at once. As stated above in relation to FIG. 4, even though there may be more than enough thumbnails to fill a row for a given genre, only one row is shown. When the user moves the focus/cursor off the genre and onto the thumbnails, the arrangement of thumbnails can then switch back to the arrangement of FIG. 3, which provides a better random access for items within a genre than FIG. 4.

While the particular SYSTEM AND METHOD FOR SCROLLING THROUGH TV VIDEO ICONS BY CATEGORY is herein shown and described in detail, it is to be understood that the subject matter which is encompassed by the present invention is limited only by the claims.

What is claimed is:

1. A method comprising:
    presenting video thumbnails on a TV, the thumbnails being grouped by genre;
    presenting a genre indicator with each group of thumbnails;
    permitting a user to move a cursor from one genre indicator to another genre indicator with a single click of a remote such that any thumbnails displayed between the indicators are skipped;
    displaying a first arrangement of thumbnails including a first genre including plural rows or columns of thumbnails and a first genre label presented at the beginning or end of an initial row of thumbnails associated with the first genre or at the top or bottom of an initial column associated with the first genre, a second genre label being presented at the beginning or end of an initial row or column of thumbnails associated with a second genre; and
    responsive to a predetermined cursor movement, displaying a second arrangement showing at least one genre label and for each genre label one and only one row or column of thumbnails.

2. The method of claim 1, wherein if the cursor is positioned over a first thumbnail in a row of thumbnails and a "down" key is manipulated on the remote control device, the cursor moves to a second thumbnail below the first thumbnail, skipping a partial row if no thumbnail is in the partial row between the first and second thumbnails, and if the cursor is positioned over the first thumbnail in a row of thumbnails and a "left" key is manipulated on the remote control device, the cursor moves to the genre label, if any, in the row, with a subsequent manipulation of a "down" key causing the cursor to move to a succeeding genre label, skipping any rows of thumbnails between the rows of the genre labels.

3. The method of claim 1, wherein a video stream can be invoked by moving the cursor over an thumbnail and appropriately manipulating the remote.

* * * * *